Figure 2:
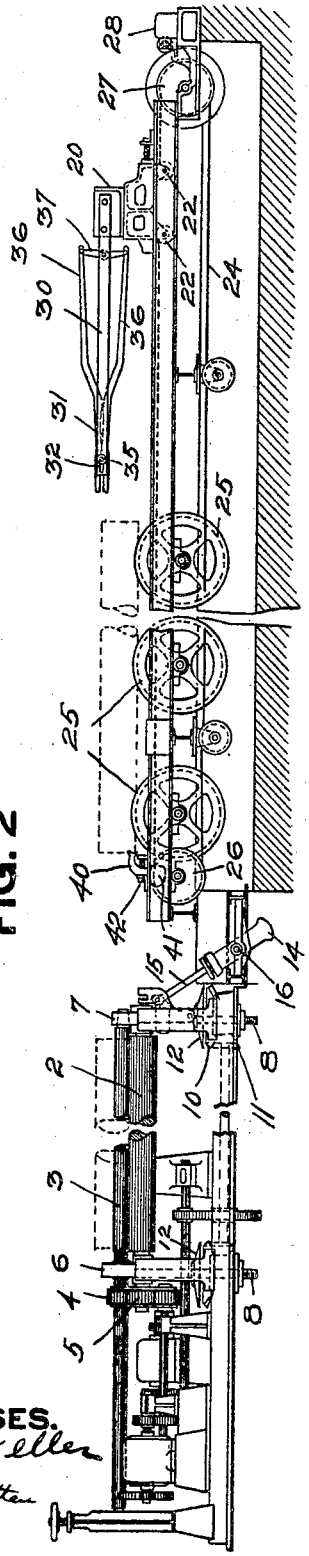

No. 807,352. PATENTED DEC. 12, 1905.
J. J. BOAX.
STRIPPER FOR BENDING ROLLS.
APPLICATION FILED JAN. 29, 1904.

5 SHEETS—SHEET 1.

WITNESSES.

INVENTOR.

No. 807,352. PATENTED DEC. 12, 1905.
J. J. BOAX.
STRIPPER FOR BENDING ROLLS.
APPLICATION FILED JAN. 29, 1904.

5 SHEETS—SHEET 2.

WITNESSES.
J. R. Keller
Robert C. Totten

INVENTOR.
John J. Boax
By Kay Totten & Winter
attorneys

No. 807,352.  
PATENTED DEC. 12, 1905.

J. J. BOAX.  
STRIPPER FOR BENDING ROLLS.  
APPLICATION FILED JAN. 29, 1904.

WITNESSES  
J. R. Keller  
R. C. Totten

INVENTOR.  
John J. Boax  
By Kay Totten White  
attorneys

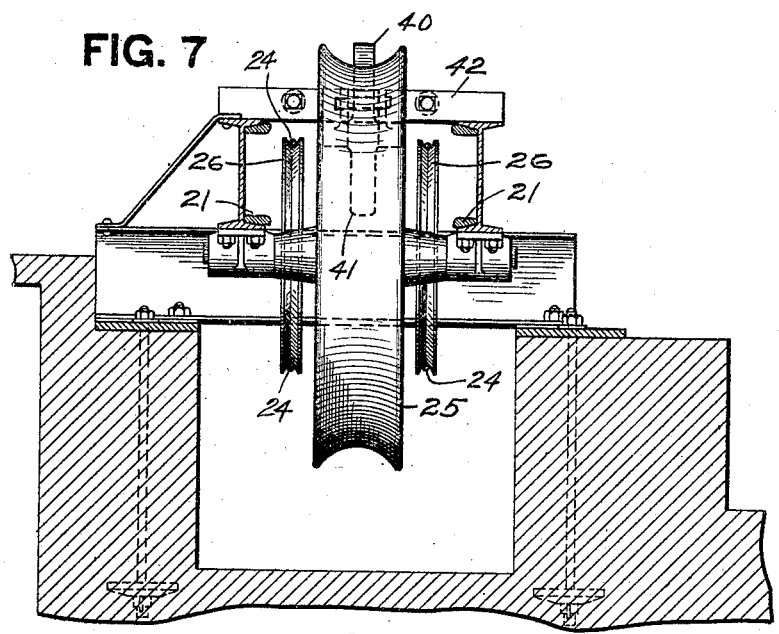
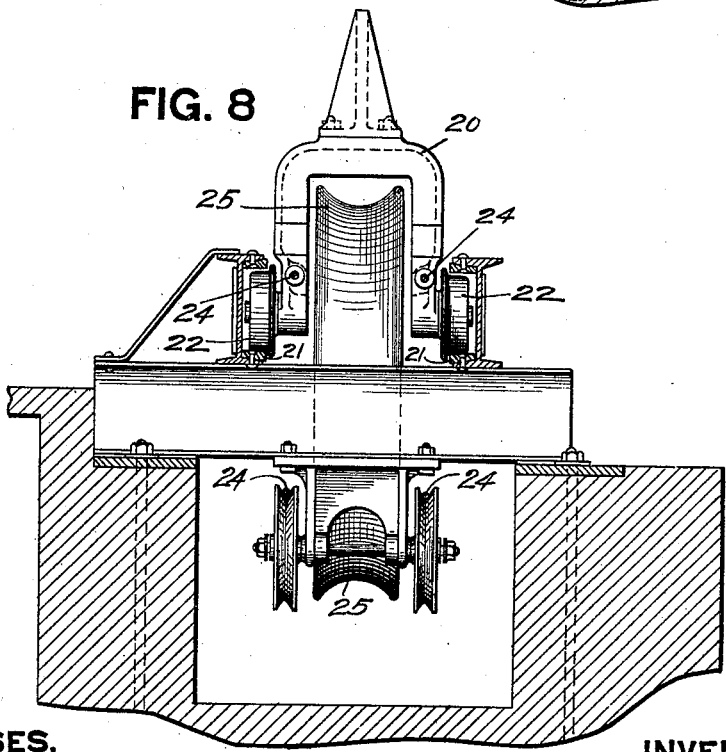

No. 807,352. PATENTED DEC. 12, 1905.
J. J. BOAX.
STRIPPER FOR BENDING ROLLS.
APPLICATION FILED JAN. 29, 1904.
5 SHEETS—SHEET 5.
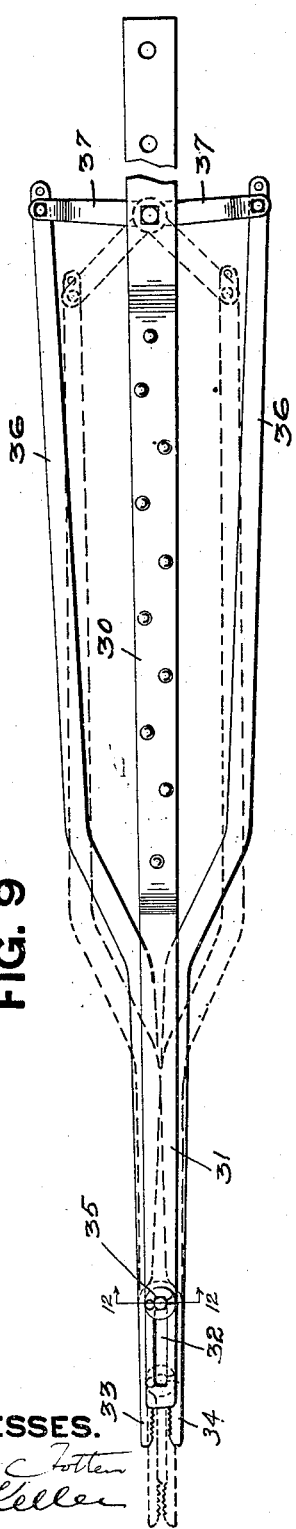
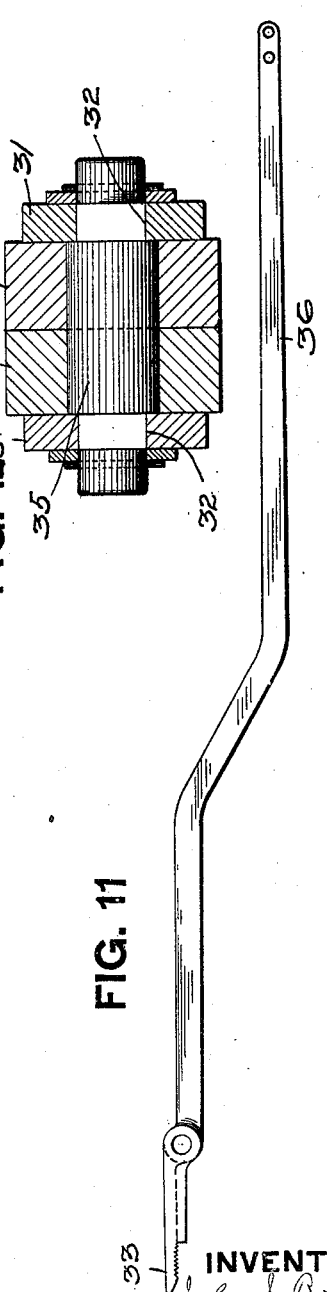
FIG. 9  FIG. 10  FIG. 12  FIG. 11
WITNESSES.  INVENTOR.

UNITED STATES PATENT OFFICE.

JOHN J. BOAX, OF McKEESPORT, PENNSYLVANIA, ASSIGNOR TO NATIONAL TUBE COMPANY, OF PITTSBURG, PENNSYLVANIA, A CORPORATION OF NEW JERSEY.

STRIPPER FOR BENDING-ROLLS.

No. 807,352.　　　　　Specification of Letters Patent.　　　　　Patented Dec. 12, 1905.

Application filed January 29, 1904. Serial No. 191,173.

*To all whom it may concern:*

Be it known that I, JOHN J. BOAX, a resident of McKeesport, in the county of Allegheny and State of Pennsylvania, have invented a new and useful Improvement in Strippers for Bending-Rolls; and I do hereby declare the following to be a full, clear, and exact description thereof.

My invention relates to mechanism for bending tube-plates into skelp by means of rolls, and more especially to the mechanism for removing or stripping the bent-up skelp from the rolls.

The principal object of my invention is to provide mechanism for stripping the skelp from the bending-rolls, which is practically automatic in operation and which will make it possible to dispense with one or more workmen.

In the manufacture of lap-weld tubing of large size the plates are bent into skelp formed by passing them sidewise between three rolls, two of said rolls being arranged side by side and the third roll being placed above the same and being adjustable vertically to press the plate down into the angle between the tops of the two bottom rolls, thus causing the plate to be bent edgewise into tubular form around the top roll. To remove the plate from the rolls, the bearing at one end of the top roll is removed, and the bent-up tube is then pulled endwise off said roll. Heretofore this has been accomplished by a workman grasping the end of the tube by means of tongs and then connecting such tongs to a traveling pulling-chain.

My invention relates to apparatus of this kind; and the principal object is to provide stripping mechanism whereby the man who places the tongs on the tube can be dispensed with, the arrangement comprising, generally speaking, a reciprocating carriage, reversing mechanism for propelling the same in either direction, and a gripping device or tongs carried thereby and so constructed that by pulling thereon it will firmly engage the tube, whereas by pushing thereon while holding the tube stationary it will be disengaged from the tube.

Figure 1:
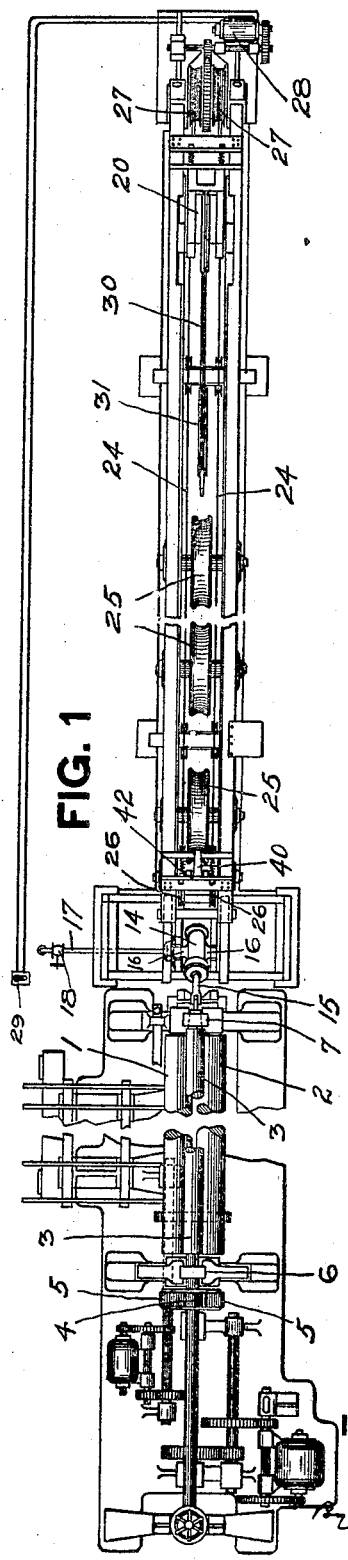
Figure 3:
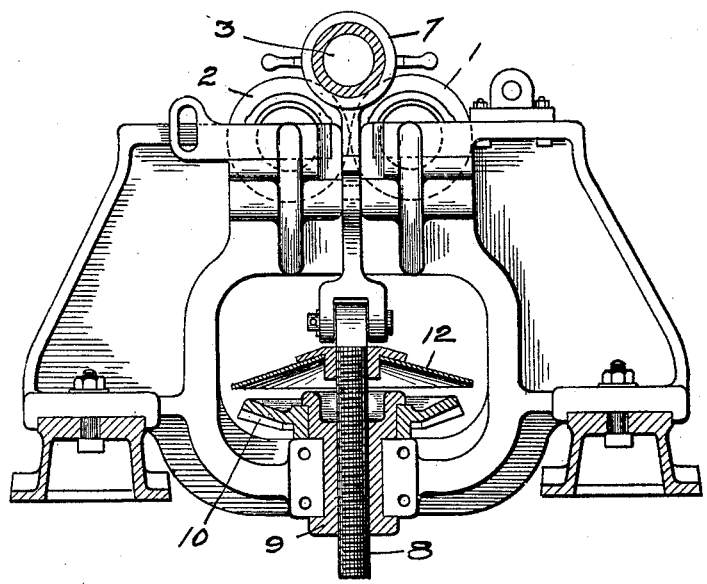
Figure 4:
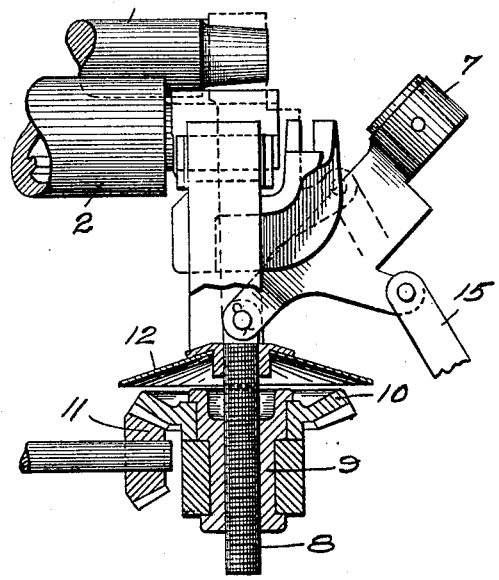

In the accompanying drawings, Figure 1 is a plan view of bending-rolls with my invention applied thereto, a portion of the rolls being broken out. Fig. 2 is a side view of the same. Fig. 3 is a vertical sectional view showing the means for adjusting the top roll. Fig. 4 is a side view, partly broken away, of the movable end bearing for the top bending-roll. Fig. 5 is a plan view of the stripping mechanism. Fig. 6 is a side view of the same. Fig. 7 is a cross-section thereof on the line 7 7, Fig. 5. Fig. 8 is a similar section on the line 8 8, Fig. 5. Fig. 9 is a side view, on an enlarged scale, of the pulling-tongs. Fig. 10 is a plan view of the same. Fig. 11 is a side view of one of the jaws and tong-levers; and Fig. 12 is a section on the line 12 12, Fig. 9.

The bending-rolls will be of the usual type, comprising bottom rolls 1 and 2, mounted in suitable housings and driven by any suitable mechanism. The top roll 3 is placed, as usual in this class of mechanism, just above the two bottom rolls. This top roll also will be driven by any suitable mechanism, preferably by the gear 4 thereon meshing with gears 5 on the bottom rolls. The bearings 6 and 7 of the top roll are vertically adjustable in order to draw said top roll down to effect the bending of the plate, this vertical adjustment being secured by connecting to the bearings of said rolls screws 8, which are surrounded by rotating nuts 9, held against longitudinal movement and provided with bevel-gears 10, the latter being engaged by power-driven pinions 11, so that thereby the top roll can be positively drawn down during the bending operation.

The construction and operation so far described is old. I have improved this construction by providing a hood or shield 12 on the screws 8 and over the gears 10, so as to protect these from scale and other foreign matter, these hoods being of general dome shape, as shown in Fig. 3.

The end bearing 7 is pivotally connected to its screw 8, as shown, in order to permit said bearing to be swung out of the way when the tube is being stripped from the top roll. Heretofore this bearing has been swung into and out of place by hand, and as it is quite heavy the labor incident thereto is quite severe. Furthermore, the workman is inconvenienced by the heat of the bent tube. Another of my improvements consists in providing power mechanism for moving this bearing. To this end I provide a power-cylinder 14, which may be either air, steam, or water and which is connected to said movable bearing in such manner that it can swing the same into and out of position. For simplicity of arrangement I prefer to connect the piston-rod 15 directly to the swinging bearing. This necessitates movement of the cylinder to accommodate itself to the position of the bearing. Consequently said cylinder is pivoted so as to freely swing, this pivoting being secured by providing it with trunnions 16, one of which is made hollow and has connected thereto the pipe 17 for admitting the pressure medium to the cylinder. The controlling-valve 18 in this pipe is placed in close proximity to the position of the bender, so that by merely manipulating this valve he is able to swing the movable bearing into or out of position, thus dispensing with the hand-labor heretofore employed.

The swinging end bearing, with its actuating means, is not claimed in this application, but is claimed in an application filed August 29, 1904, Serial No. 222,575, which is a division of this application.

The stripping mechanism comprises a carriage 20, adapted to reciprocate on ways 21 in any convenient manner, such as by providing said carriage with wheels 22, running in channels formed in said ways, as clearly shown in Fig. 7. This carriage is reciprocated back and forth by any suitable mechanism, such as connecting thereto both ends of a cable or cables 24, two such cables being preferably used, one on each side of the median line of the pulling mechanism, for the reason that in the median line of the pulling mechanism are a series of tube-supporting pulleys or rollers 25. Each of these cables passes around a suitable guide-sheave 26 at the front end of the stripping-bench, and it is also secured to a winding-drum 27, mounted in the rear end of the pulling-bench. This winding-drum is driven by any suitable reversing mechanism, such as a reversing electric motor 28. As a consequence the carriage 20 can be propelled positively in both directions by properly manipulating the controller 29 for the motor. The controller for this motor will also be placed close to the position of the bender, so that he will not only be able to operate the movable bearing of the bending-rolls, but will also be able to traverse the stripping-carriage 20 back and forth.

Connected to the carriage 20 is a gripping device so arranged that it is practically automatic in its engagement and disengagement with the tube. The specific form of gripping device shown comprises an arm 30, projecting forwardly from the carriage and having at its forward end a fork 31, both arms of which are provided with a slot 32. The gripping device proper comprises tongs having two jaws 33 and 34, which are pivotally connected by the pin 35. The ends of this pivot-pin project beyond the sides of the jaws and into the slots 32 of the arm 30 and are provided with washers outside of the arm 30 to hold the same from displacement. The reins or levers 36 of the tong-jaws extend backwardly and have connected thereto the outer ends of toggle-links 37, the inner ends of said links being pivoted to the arm 30 or other suitable portion of the carriage.

The tongs are opened by sliding them backwardly with reference to the stationary arm 30, the pivoted pin 35 of said jaws riding along the slots 32. This will cause the toggle-links 37 to assume a vertical position, thus spreading the tong-levers apart and opening the tong-jaws in the well-understood manner. The toggle-links 37 will pass slightly beyond the vertical position, so that the tongs normally remain open. In this position the carriage is propelled forwardly, and after the movable bearing 7 has been swung downwardly the tongs are projected until the jaws pass onto the end of the tube to be stripped. The operator will then either hold said jaws stationary or else will move the same slightly forward, thus swinging the toggle-links 37 beyond their centers, so that the jaws will automatically close. The motor will then be reversed, drawing the carriage backward, and as the pull is entirely on the toggle-links 37 it will act to firmly close the tongs onto the pipe, and the stronger the pull the stronger will be the grip of the tongs on the pipe. The backward movement of the carriage will thus pull the tube off the top roll and onto the supporting-rollers 25.

At the forward end of the stripping mechanism is a pivoted dog 40, provided with a counterweight 41, which will normally hold the same above the line of travel of the tube and against a stop 42, but will permit the same to swing down while the tube is passing over the same. As soon as the tube has passed the counterweight will throw said dog up behind the tube and against the stop 42. The motor is then again reversed, thus driving the carriage forward and pushing the tongs and tube backward. This will continue until the tube strikes the dog 40, when the tube will stop and in the further travel of the carriage the tongs, being held by the tube against movement, will force the knuckle-joint of the toggle-links 37 forward, thus straightening said links and opening the tongs, this movement continuing until said links have swung slightly past their centers, so that the tongs will be held in their open position. The carriage is then again reversed, so as to clear the tongs from the tube, and the tube is then removed. As soon as another tube is ready to be stripped the carriage will again be moved forward until the tongs engage the new tube, when the operator will again move the tongs slightly forward, as can be readily done by grasping one of the reins thereof or giving one of the toggle-links a slight blow, so as to again cause the tongs to grip the tube on the backward movement of the carriage.

It will thus be seen that all of the operations of the gripping mechanism are substantially automatically performed by merely traversing the carriage back and forth, the only manual operation necessary being a slight forward movement given to the tongs when opened in order to initiate their closing movement. Inasmuch as the controller 29 for the motor 28 and the valve 18 for the cylinder 14 can be placed close to the hand of the bender, he will be able to control all of the movements of the stripper and of the movable bearing for the top roll, thus dispensing with the workmen heretofore necessary for doing this work.

What I claim is—

1. A stripping device for plate-bending rolls comprising a device arranged to reciprocate longitudinally of the axes of the bending-rolls, a gripper carried by said reciprocating device and arranged to engage the tube and strip the same from the rolls, and mechanism controllable independently of the rolls for reciprocating said device.

2. A stripping device for plate-bending rolls comprising a carriage arranged to reciprocate longitudinally of the axes of the bending-rolls, an automatically opening and closing device carried by said carriage, and mechanism controllable independently of the rolls for reciprocating said carriage.

3. A stripping device for plate-bending rolls comprising a carriage arranged to reciprocate longitudinally of the axes of the bending-rolls, a gripping device connected thereto and comprising tongs provided with gripping-jaws and reins, links pivotally connected to said reins and to the reciprocating carriage, and mechanism for reciprocating the said carriage.

4. A stripping device for bending-rolls comprising a reciprocating carriage, an automatically-opening gripping device connected to said carriage, a swinging stop at the front end of said device, and reversing driving means for said reciprocating carriage.

5. A stripping device for bending-rolls comprising a bench, a counterweighted pivoted dog at the forward end of said bench, a member adapted to reciprocate along said bench, a reversing-motor for reciprocating said member, and an automatically-opening gripping device carried by said reciprocating member.

6. A stripping device for bending-rolls comprising a reciprocating member, a gripping device connected thereto and comprising a supporting-bar, tong members, a pivot for said tong members having a sliding connection with said bar, and links pivotally connected to the reins of said tong members and to said bar.

7. A stripping device for bending-rolls comprising a reciprocating carriage, a gripping device carried by said carriage and comprising a support, tongs having pivotally-connected members, the pivot thereof having a sliding bearing on said support, and links connected at one of their ends to the reins of said tong members and having their opposite ends connected to said support.

8. A stripping device for bending-rolls comprising a bench, a swinging counterweighted dog at the forward end thereof, a reciprocating carriage moving on said bench, reversing power mechanism for driving said carriage, tongs connected to said carriage and having two members pivotally connected together, a support for said tongs with which they have a sliding connection, and links connected to the reins of said tongs and to the carriage.

In testimony whereof I, the said JOHN J. BOAX, have hereunto set my hand.

JOHN J. BOAX.

Witnesses:
ROBERT C. TOTTEN,
G. KREMER.